United States Patent [19]
Treynor

[11] 3,931,604
[45] Jan. 6, 1976

[54] SAMPLING AUTOMATIC EQUALIZER

[76] Inventor: Paul E. Treynor, 8601 Powhatan St., New Carrollton, Md. 20784

[22] Filed: Apr. 10, 1974

[21] Appl. No.: 459,643

[52] U.S. Cl.............. 333/18; 333/70 A; 333/70 T; 328/167
[51] Int. Cl.². ........................................ H04B 3/14
[58] Field of Search ................. 333/18, 70 A, 70 T; 328/167

[56]  References Cited
UNITED STATES PATENTS

| 3,445,685 | 5/1969 | Roth .............................. 328/167 X |
| 3,604,947 | 9/1971 | Puthuff ........................... 328/167 X |
| 3,809,923 | 5/1974 | Esser ............................... 333/18 X |

Primary Examiner—Paul L. Gensler
Attorney, Agent, or Firm—Larson, Taylor and Hinds

[57] ABSTRACT

An automatic transversal equalizer is provided wherein the input signal is sampled and stored on a series of capacitors. The capacitor voltages are sequentially recalled for application to an analog multiplier which also receives a sequence of coefficient voltages which have been stored by a second series of capacitors. The single analog multiplier performs the functions of the plural voltage controlled attenuators of prior art equalizers.

12 Claims, 12 Drawing Figures

FIG. 2

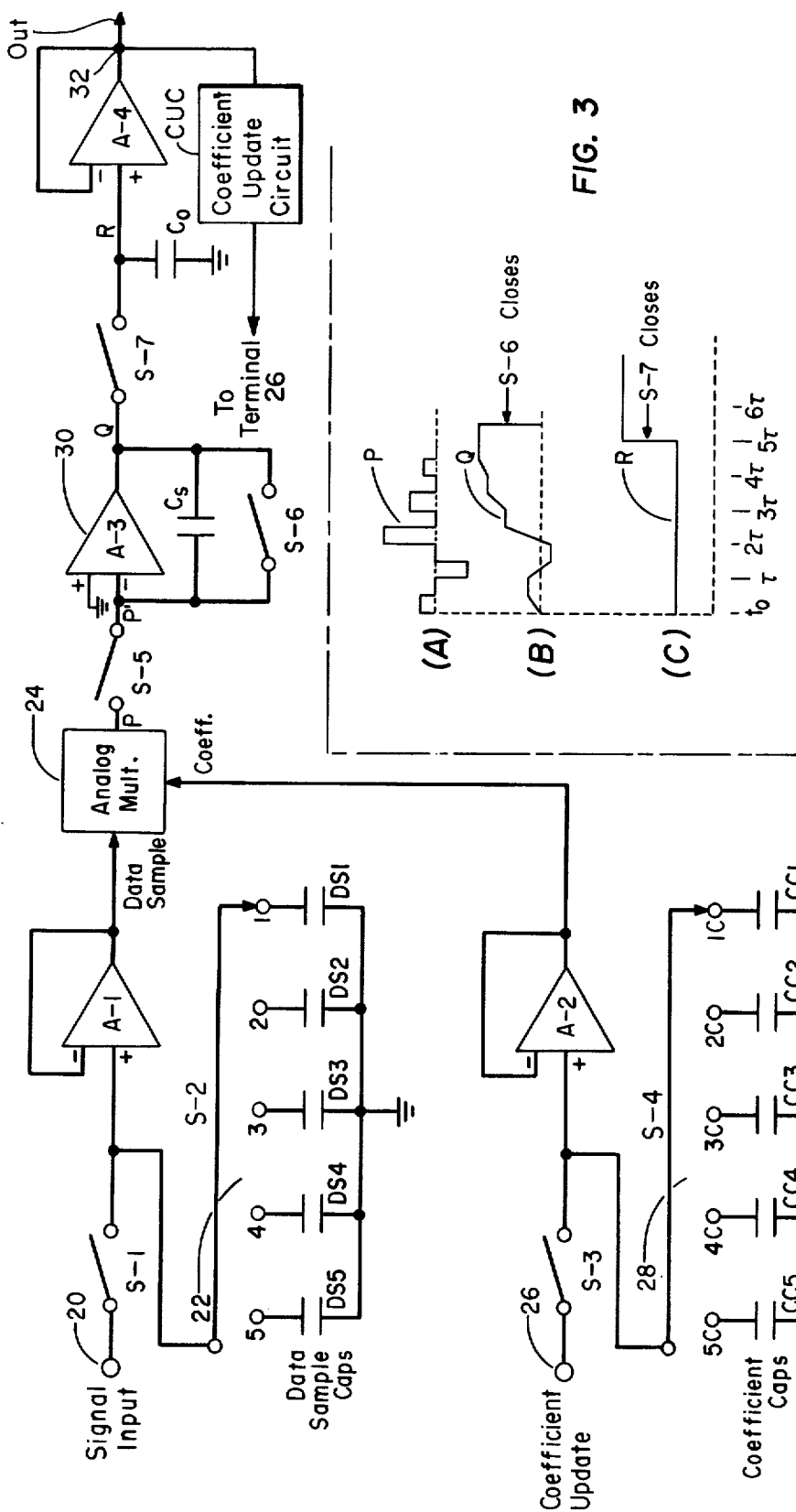

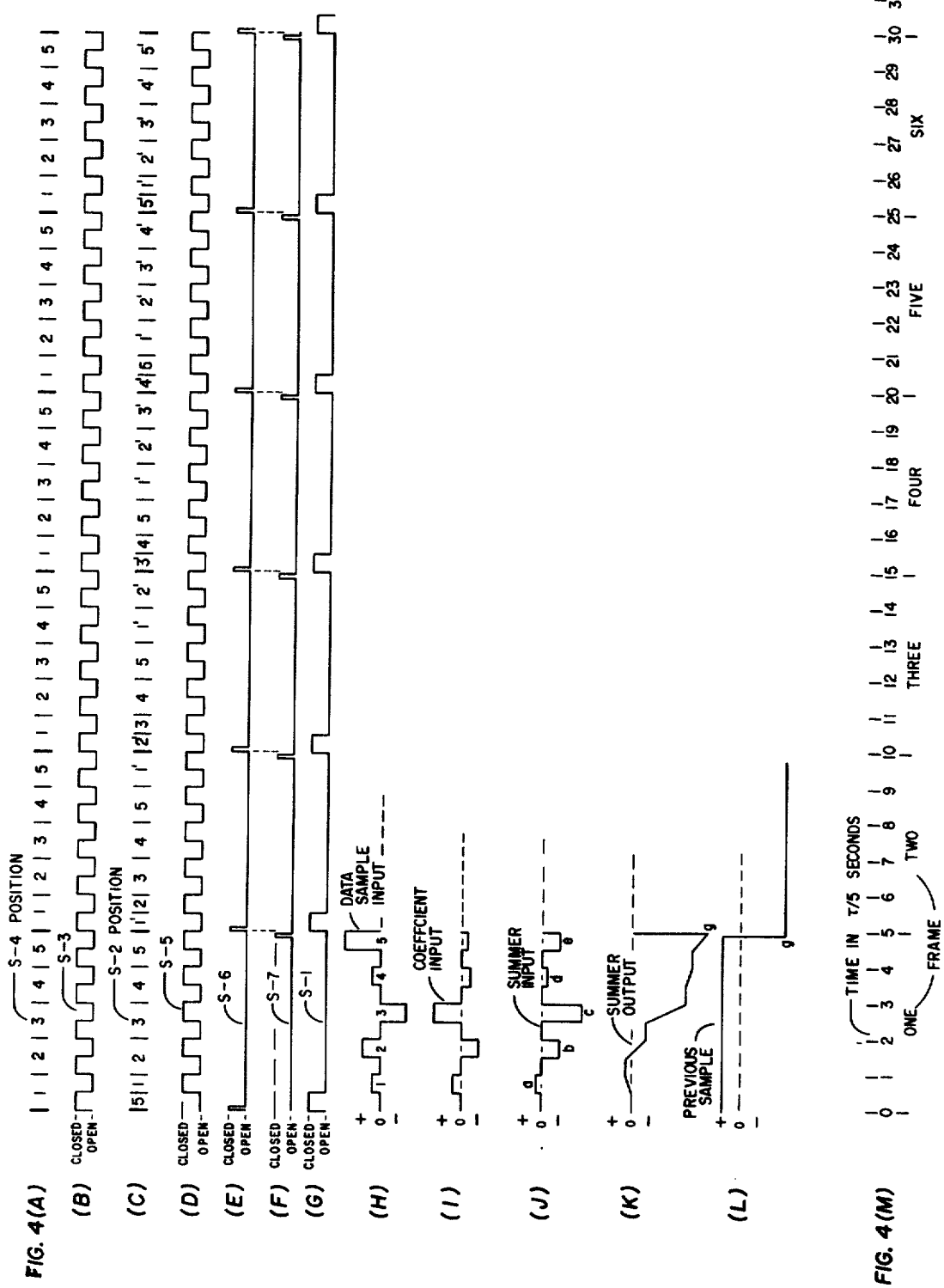

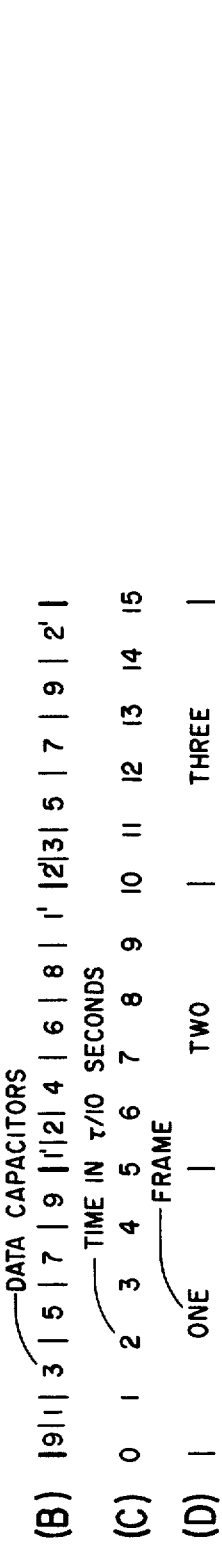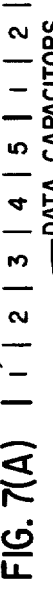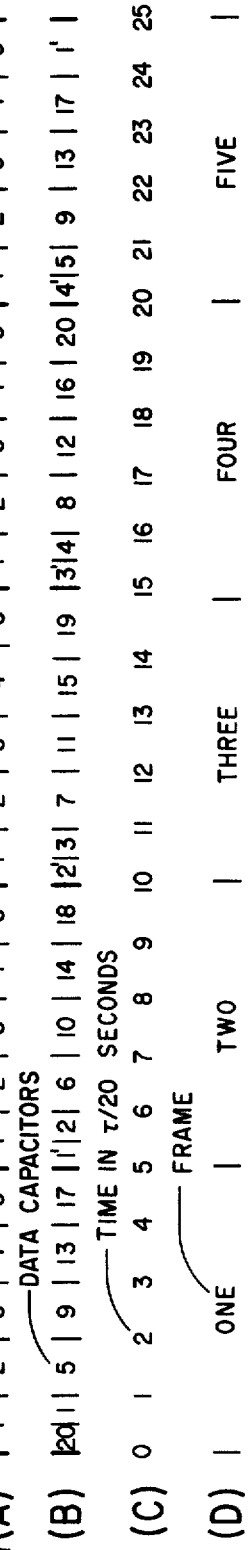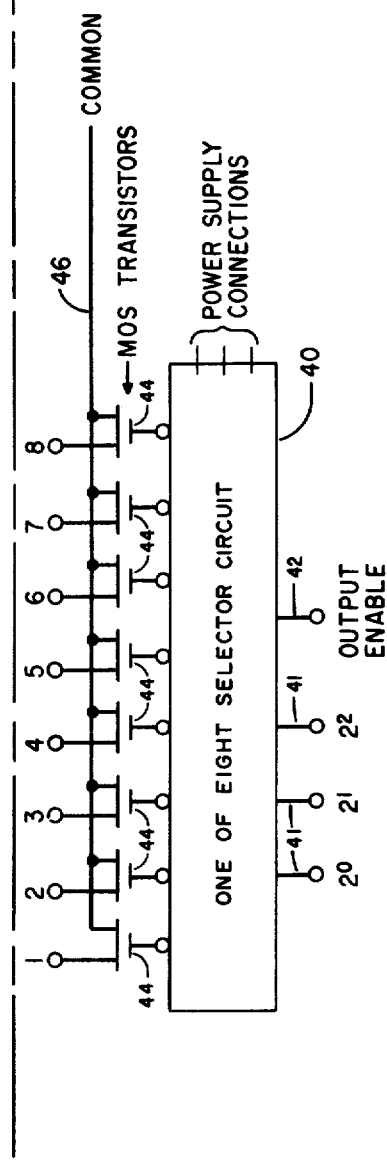
FIG. 6(A), (B), (C), (D)
FIG. 7(A), (B), (C), (D)
FIG. 8

SAMPLING AUTOMATIC EQUALIZER

FIELD OF THE INVENTION

The present invention relates to automatic transversal equalizers.

BACKGROUND OF THE INVENTION

The transversal equalizer is an electronic device which is widely employed in data sets (which transmit digital data over telephone lines) to equalize the amplitude response and envelope delay characteristics of the line. Reference is made to the article "Transversal Filters", Proc. of IRE, July 1940, pages 302 to 310, and to U.S. Pat. Nos. 3,292,110; 2,379,744; 2,719,270; 3,414,819; 3,368,168; 3,414,845 and 3,648,171, for a discussion and examples of such equalizers. In recent years transversal equalizers have been developed which are internally adjusted by closed loop control systems to provide automatic equalization for any telephone line to which the equalizer and the associated data set are connected.

Tranversal equalizers have been implemented using both analog and digital circuits. In analog implemented equalizers two basic electronic circuit components are characteristically employed, viz., tapped delay lines and voltage controlled attenuators. Typically, an eleven tap baseband equalizer, such as shown, for example, in U.S. Pat. No. 3,629,736, employs eleven or more voltage controlled attenuators and ten or more delay line sections. When such an equalizer is employed for line equalization the number of voltage controlled attenuators is doubled for each tap (see U.S. Pat. Nos. 3,400,332 and 3,727,136). It is these two circuit components, i.e., the delay lines and attenuators, which make up most of the hardware of automatic equalizers. Fully digital equalizers do not require these two circuit components but such digital equalizers are both large and expensive unless implemented with large scale MOS custom integrated circuits. Such digital equalizers typically employ ten bit words to represent voltage levels and use shift registers to provide the required delays. In such equalizers, the function of the voltage controlled attenuators is provided by fully digital multipliers. Reference is made to U.S. Pat. Nos. 3,633,014; 3,633,105; 3,651,376; and 3,699,321 for examples of digital transversal equalizers.

SUMMARY OF THE INVENTION

In accordance with the invention, a transversal automatic equalizer is provided which by employing digital techniques provides a substantial reduction in component hardware as compared with prior art equalizers and which can be implemented at relatively low cost. For example, the equalizer of the invention requires only one voltage controlled attenuator as compared with the ten or more required by prior art systems.

Generally speaking, the equalizer of the invention provides sampling and storing of the input signal on capacitors and sequential recalling of the stored samples for processing. More particularly, the data input signal to the equalizer is sampled, and is stored by a first series of capacitors, a series of internally generated coefficient voltages being stored by a second series of capacitors. The voltages stored by the data sample capacitors and the coefficient voltages are applied in a predetermined sequence to respective inputs of an analog multiplier to produce a sequence of pulses which are representative of the products of the data sample and coefficient voltages. The output of the multiplier is connected to an analog integrator which functions as a summing device. A sample and hold circuit is connected to the output of the integrator.

The coefficient voltages stored on the second series of capacitors are generated and updated by internal circuits of the equalizer which derive their input from the output signal. Thus, the equalizer is an automatic, closed loop device.

As stated, the equalizer of the invention can be implemented at relatively low cost, the cost reduction resulting from the use of integrated circuit multiplexers employing MOS transistors.

Other features and advantages of the invention will be set forth in, or apparent from, the detailed description of the preferred embodiments which follows hereinbelow.

BRIEF DESCRIPTION OF THE DRAWINGS

FIG. 2 is a schematic circuit diagram of an automatic transversal equalizer in accordance with the invention;

FIGS. 3(A) to 3(C) are exemplary voltages waveforms appearing at several points in the equalizer of FIG. 2;

FIGS. 4(A) and 4(M) are further voltage waveforms and timing diagrams used in explaining the operation of the equalizer of FIG. 2;

FIGS. 6(A) to 6(D) are timing diagrams used in demonstrating the coefficient and data sample timing relationships for a five-tap, two sample per baud equalizer;

FIGS. 7(A) to 7(D) are timing diagrams used in demonstrating the coefficient and data sample timing relationships for a five-tap, four sample per baud equalizer;

FIG. 8 is a schematic circuit diagram of a standard eight-channel MOS integrated circuit multiplexer;

DESCRIPTION OF A PREFERRED EMBODIMENT

Figure 1:
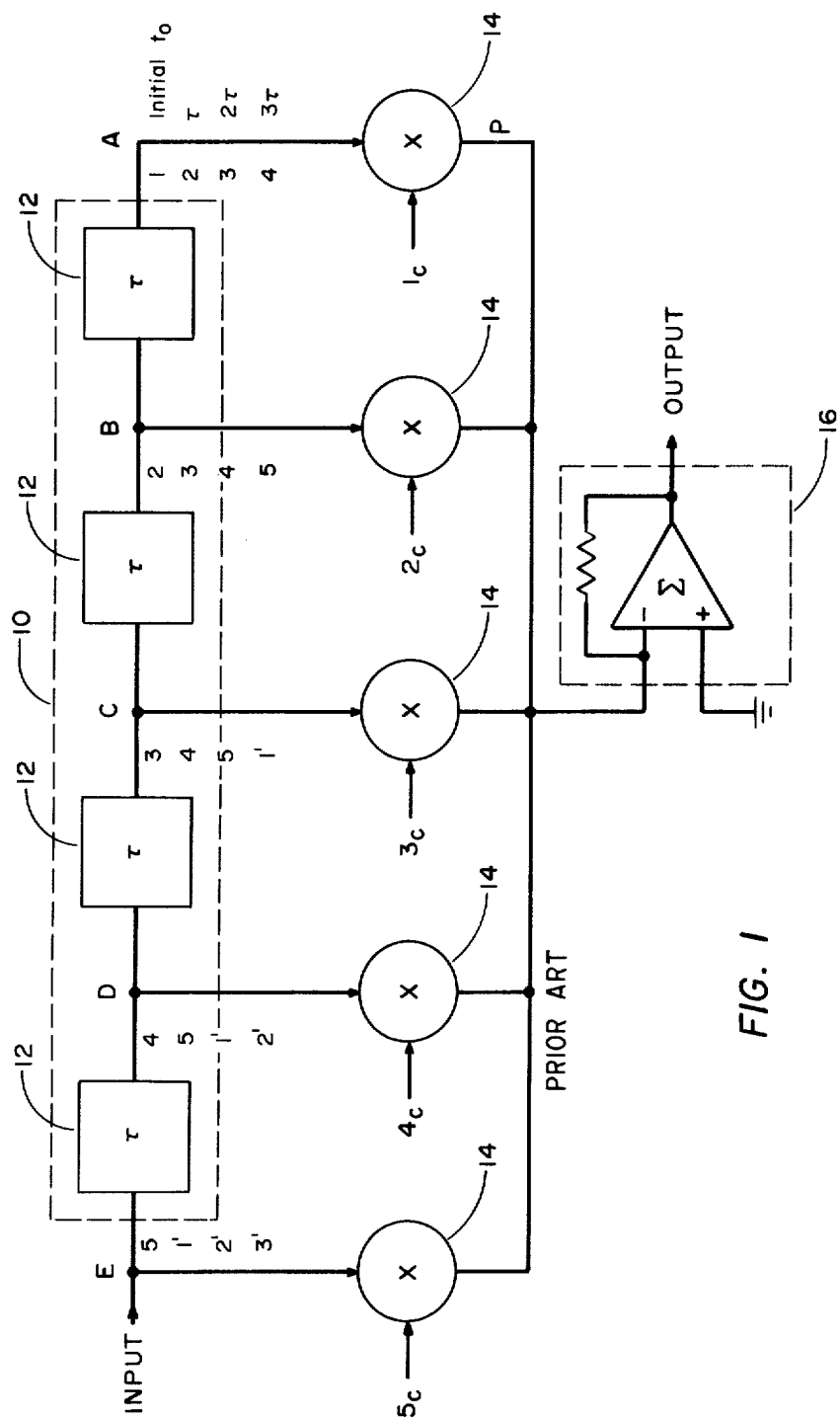
FIG. 1 is a schematic circuit diagram of a conventional, one sample per baud, transversal equalizer.

The present invention is perhaps best understood by considering the operation of a prior art transversal equalizer and then demonstrating how the equalizer of the invention provides the same function with digital samples. The basic analog system simulated by the invention is shown in FIG. 1 and comprises a transversal filter comprising a delay line, denoted 10 and usually of the active type, which is made up of a series of incremented delay networks, represented by blocks 12, which provide a delay $\tau$ for a data set baud rate of $1/\tau$. Thus, referring to FIG. 1, a signal at a point D was transmitted $\tau$ seconds before that at point E, a signal at point C was transmitted $2\tau$ seconds before that at point E and so on. Conventional analog multipliers (or attenuators) are represented by circles 14 and are adapted to receive internally generated control signals $1c$ to $5c$ for optimally equalizing the system. The output of the first analog multiplier on the right, at the point P, is the product of the signal at A times the d.c. or slowly varying control signal $1c$ which forms the second input to that multiplier. Thus, for example, if the control input $1c = 0$ volts, $P = 0$ volts, and if $1c = +1$ volts, $P = A$ and if $1c = -1$ volts, $P = A$ but inverted in polarity. The outputs of all of the multipliers 14 are summed by a summing network indicated at 16. Although a simplified five-tap equalizer such as shown in FIG. 1 is being discussed here, it will be understood that typical transversal equalizers employ a minimum of seven taps with some equalizers employing as many as 64 taps. As will become more apparent hereinafter, the economic advantage of the present invention is greatest when the number of taps is high.

Considering the operation of the transversal equalizer of FIG. 1, at a particular instant of time, denoted $t_o$, the signal at point A is a voltage which will be denoted 1, that at point B is voltage 2, that at C a voltage 3, at D a voltage 4 and at E a voltage 5. It will be understood that the numbers given to the voltages are used merely to indicate sequence and not necessarily magnitude. After an interval $\tau$ seconds, equal to the delay provided by each section 12 of delay line 10, the signal at A is voltage 2, at B is voltage 3, at C is voltage 4 and at D is voltage 5, while point E receives the next input which is denoted $1'$. This voltage could also be properly denoted 6 but the number $1'$ is convenient for discussion purposes. After a time $2\tau$ seconds after $t_o$, the voltages at the various points are as indicated in FIG. 1. The voltages for the time $t_o + 3\tau$ are also indicated in FIG. 1.

Returning now to the initial time $t_o$, the output of the first multiplier 14, i.e., the output at point P in FIG. 1, is the product of the control coefficient $1c$ and the voltage 1. Similarly, the output of the second multiplier is $2c \times 2$. The table hereinbelow, which is derived from FIG. 1, shows the various multiplier outputs for the times $t_o$, $t_o + \tau$, $t_o + 2\tau$ and $t_o + 3\tau$.

series of data sample capacitors, which are collectively denoted 22 and individually denoted DS1 to DS5. The output of switch S-1 is also connected to a unity gain amplifier A-1 to a first, "data sample" input of an analog multiplier 24. Amplifier A-1 provides a high impedance to ensure that the discharge of the data sample capacitors 22 is negligible. A coefficient update terminal 26 is connected through a third switch S-3 to a fourth switch S-4. Switch S-4 is selectively connected through terminals $1c$ to $5c$ to a corresponding series of coefficient capacitors which are collectively denoted 28 and individually denoted CC1 to CC5. The output of switch S-3 is connected through a further unity gain amplifier A-2 to a second, "coefficient" input to analog multiplier 24.

The output of analog multiplier 24, which is denoted P, is connected through a switch S-5 to a ramp integrator circuit 30 formed by a further amplifier A-3 and a capacitor $C_3$ connected across amplifier A-3. Integrator 30 functions as a summer and produces a linearly varying voltage proportional to the amplitude of the pulse input, this voltage level being held when the pulse is removed from input P'. A switch S-6 is connected across capacitor $C_s$. The output, Q, of integrator 30 is connected through a further switch S-7 to a shunt storage capacitor $C_o$. The non-grounded plate of storage capacitor $C_o$ is connected through a further amplifier A-4 to the equalizer output terminal 32.

Considering the operation of the equalizer circuit of FIG. 2, it is assumed that all data sample capacitors 22 and coefficient capacitors 28 are charged to proper values by previous timing cycles and that all switches S-1 to S-7 are in the initial positions illustrated in FIG. 2. Following the operation in sequence, switch S-3 first closes and injects a small current into first coefficient capacitor CC1. This current may be positive or negative and produces a relatively small amount of change in the voltage on capacitor CC1. The voltages on the coefficient capacitors 28 are essentially d.c. and it takes a large number of update cycles to produce a significant change in capacitor voltage.

After capacitor CC1 receives its update current, switch S-3 opens and switch S-5 closes. The voltage on data sample capacitor DS1, which contains data sample

| TIME | FRAME | OUTPUT | | |
|---|---|---|---|---|
| $t_o$ | 1 | $(1c \times 1) + (2c \times 2) + (3c \times 3)$ | $+ (4c \times 4)$ | $+ (5c \times 5)$ |
| $t_o + 1\tau$ | 2 | $(1c \times 2) + (2c \times 3) + (3c \times 4)$ | $+ (4c \times 5)$ | $+ (5c \times 1')$ |
| $t_o + 2\tau$ | 3 | $(1c \times 3) + (2c \times 4) + (3c \times 5)$ | $+ (4c \times 1')$ | $+ (5c \times 2')$ |
| $t_o + 3\tau$ | 4 | $(1c \times 4) + (2c + 5) + (3c \times 1')$ | $+ (4c \times 2')$ | $+ (5c \times 3')$ |

The circuit of FIG. 1 is an analog circuit and we know from sampling theory that analog voltages can be sampled and used, and, if desired, can be restored to analog form, by filtering or, more efficiently, by applying a pulse sample to a sample and hold circuit and then filtering. In accordance with the present invention, the analog signals are sampled and the signal samples are multiplied by appropriate coefficient samples to produce voltage samples which are then summed to provide the desired outputs indicated in the table above.

Referring to FIG. 2, a basic form of the equalizer of the invention is shown. The equalizer of FIG. 2 includes an input terminal 20 which is connected through a first switch S-1 to a second switch S-2 which provides a connection through terminals 1 to 5 to a corresponding 1, is applied through unity gain amplifier A-1 to one input of analog multiplier 24 while the voltage of coefficient capacitor CC1 is applied through amplifier A-2 to the other input of multiplier 24.

The output P of analog multiplier 24 is a pulse having an amplitude proportional to the product of the voltage data sample capacitor DS1 and the voltage on coefficient capacitor CC1. An exemplary waveform is illustrated in FIG. 3(A). The pulse output of multiplier 24 is applied through switch S-5 to integrator (ramp generator) circuit 30 which, as stated above, produces a linearly varying voltage proportional to the amplitude of the pulse input. The voltage level is held when the pulse is removed and, thus, at the end of each pulse, the voltage change at the output of integrator 30 is proportional to the product output of multiplier 24 which, for the positions of switches S2 and S4 just considered and using the nomenclature used above, is the product of the data sample voltage 1 and the coefficient capacitor voltage $1c$.

Continuing the discussion of the operation of the equalizer of FIG. 2, switches S-2 and S-4 are next moved to terminal positions 2 and $2c$, respectively. Switch S-3 then closes briefly to slightly update coefficient capacitor CC2 and then opens. As described above, the voltage on data sample capacitor DS2, which corresponds to data sample 2, is applied to one input of multiplier 24 and the voltage on coefficient capacitor CC2 is applied to the other input so that, at this time, the output of multiplier 24 is the product of data sample 2 and coefficient $2c$. Switch S-5 now closes and the output of integrator 30 changes by a voltage equal to the product $2 \times 2c$. At the end of this ramp time, the output of Q is proportional to the sum of products $(1 \times 1c) + (2 \times 2c)$.

Switches S-2 and S-4 then move in sequence through terminal positions 3 to 5 and $3c$ to $5c$, respectively, so that the products $3 \times 3c$, $4 \times 4c$, and $5 \times 5c$ are formed. At the end of this sequence the output Q of integrator 30 is proportional to the sum $(1 \times 1c) + (2 \times 2c) + (3 \times 3c) + (4 \times 4c) + (5 \times 5c)$ which corresponds to the analog equivalent voltage at the time $t_o$ given in the table above. The output Q of integrator 30 for an exemplary sequence is shown in FIG. 3(B). Switch S-7 now closes to provide storage of this voltage on storage capacitor $C_o$ and hence an output voltage through amplifier A-4. The waveform at R, i.e., the voltage on capacitor $C_o$, is shown in FIG. 3(C), the first level representing that of the previous sample and the second level the sample and hold waveform, a level equal to the sum of the products set forth above. Switch S-7 then opens so as to hold the output voltage at the value given above while the next sum of products is formed. Switch S-6 closes to discharge capacitor $C_s$ and then opens to permit the next summation.

A new data sample is then stored. (It is noted that, of course, such a data storage step necessarily preceded the starting point of the description above.) Storage of a new data sample here occurs when S-2 moves to position 1, and switch S-1 quickly closes to charge data storage capacitor DS1 to the new data sample voltage and then opens. During this period, switch S-3 is closed and switch S-4 is in terminal position $1c$. A small update current is applied to coefficient capacitor $1c$, switch S-3 opens and switch S-4 moves to position 2. Switch S-5 now closes and the product of data sample 2 and coefficient $1c$ produced at the output of analog multiplier 24 is applied to integrator 30. Switch S-5 then opens, and switch S-2 moves to terminal position 3 and switch S-4 to terminal position $2c$. Switch S-3 quickly closes to update capacitor $2c$ and then opens. Switch S-5 closes and the product of data sample 3 and coefficient $2c$ is formed. This operation continues as S-4 moves through terminal positions $3c$, $4c$ and $5c$ and switch S-2 simultaneously moves through terminal positions 4, 5 and 1. At the end of the sequence the output of integrator circuit 30 is proportional to the sum of the products: $(1c \times 2) + (2c \times 3) + (3c \times 4) + (4c \times 5) + (5c \times 1')$. This is, of course, the sum shown for the time $t_o + \tau$ in the table above.

As the operation continues the sums of products listed for $t_o + 2\tau$, $t_o + 3\tau$, etc. are formed.

Referring to FIGS. 4(A) to 4(L), further timing diagrams for the equalizer of FIG. 2 are shown. In these figures time is indicated along the abscissa in FIG. 4(M) and, as indicated, is normalized to $\tau/5$ seconds. A frame scale is given in FIG. 4(M) below the time scale, these frames lasting $5\tau$ seconds. With the exception of data capacitor selection, all timing functions reoccur cyclically each frame. Considering the other timing diagrams and typical waveforms generally, FIGS. 4(A) to 4(C) indicate the switch positions for the capacitors described above, FIGS. 4(D) to 4(G) the read, clear, store and data sample timing, and FIGS. 4(H) to 4(K) typical waveforms for one frame.

Referring to FIG. 4(A), it will be seen that the action of switch S-4 in selecting coefficient capacitors 28 is cyclic with selections 1, 2, 3, 4, 5; 1, 2, 3, 4, 5; and so on, occurring repetitively. The timing diagram of FIG. 4(B) indicates that the coefficient capacitors 28 are updated during the first half time that switch S-4 has selected a given capacitor. The coefficient capacitor voltages are used during the second half time that switch S-4 has selected a given capacitor and this is shown by the timing diagram of FIG. 4(D). FIG. 4(C) indicates the sequence of operation of switch S-2 of the data sample capacitors 22.

Referring to FIG. 4(F), this depicts the time of closure of switch S-7 which corresponds to the store sum function. This repetitive sample and storage occurs after five coefficients have occurred and, will be seen to be a short interval at the end of the fifth coefficient. FIG. 4(E) is a timing diagram for the closing of switch S-6 which corresponds to the clear sum function and which occurs immediately after the store sum function (FIG. 4(F)). When switch S-6 closes, the integrator circuit 30, which, as stated, functions as a summer, is reset to zero so that the next sequential sum can be accumulated. FIG. 4(G) illustrates the timing of the operation of switch S-1 which controls the sample input.

Briefly comparing the equalizer of FIG. 2 with the analog equalizer of FIG. 1, the data sample capacitors 22 and switch S-1 corresponds to the four delay sections, the single analog multiplier 24, which is time shared, corresponds to the five analog multipliers, the integrator 30 formed by amplifier A-3, capacitor $C_s$ and switch S-6 corresponds to the summer 16, and the switch S-4 and coefficient capacitors 28, to analog integrators which are not shown in FIG. 1 but which would include five operational amplifiers and five capacitors. There are no elements in the analog equalizer of FIG. 1 which correspond to switch S-7, capacitor $C_o$ and amplifier A-4.

All selections considered so far have been repetitive for each frame. The data samples, however, are not repetitive. The reason for this is apparent from the table given above which shows that for the four frames presented, coefficient $1c$ multiplies sample 1 for frame 1, sample 2 for frame 2 and so on. It is also noted from this table that a new data sample, indicated as $1'$, $2'$ and so on must be employed for the last coefficient multiplication ($5c$ of the table). Timing diagram 4(C), as stated above, shows the sequence of switch S-2 in selecting data sample capacitors 22. As shown, in frame 1, during coefficient 1 time, capacitor 5 is selected and a new data sample is stored thereby. This storage occurs only during the first half of coefficient 1, i.e., the time during which coefficient capacitor CC1 is being updated. During the second half of coefficient time 1 of frame 1, switch S-2 selects capacitor 1 and the previously stored data sample is applied to one input of multiplier 24, the voltage on coefficient capacitor CC1 being applied to the multiplier input as set forth hereinabove. Next, the data samples 2 through 5 are sequentially applied to multiplier 24 by switch S-2, also as discussed. Without going into further detail, it can be seen from the timing diagram of FIG. 4(A) and 4(C) that coefficient capacitors 28 are switched in a 1 to 5 sequence but that the data sample capacitors 22 are sequenced through six. The following table illustrates the data sample capacitor sequence of switch S-2:

| FRAME | STORE | READ  |               |
|-------|-------|-------|---------------|
| 1     | 5     | 1 2 3 4 5 |           |
| 2     | 1     | 2 3 4 5 1 |           |
| 3     | 2     | 3 4 5 1 2 | Sequence  |
| 4     | 3     | 4 5 1 2 3 |           |
| 5     | 4     | 5 1 2 3 4 |           |
| 6     | 5     | 1 2 3 4 5 |           |
|       |       |       | Repeat above sequence |
| 7     | 1     | 2 3 4 5 1 |           |

Considering the sampled waveforms of FIGS. 4(H) to 4(L), FIG. 4(H) is an example of a typical data sample sequence applied to the multiplier 24, this sequence being obtained from the data sample capacitors 22 as switch S-2 sequences through terminal positions 1 to 5. Similarly, FIG. 4(I) shows a typical coefficient sequence which is generated as switch S-4 sequences through terminal positions 1c to 5c. (FIG. 4(J) represents the output of multiplier 24 which is equal to the product of inputs H and I (times an appropriate scale factor, in this case ½). FIG. 4(J), of course, corresponds to FIG. 3(A) with different inputs to multiplier 24. FIG. 4(K) (which corresponds to FIG. 3(B)) depicts the output of summer or integrator circuit 30. Waveform J of FIG. 4(J), of course, forms the input to integrator 30 and during pulse $a$ of input waveform J the output K ramps up to the value shown and then holds this value while the input goes to zero. During input pulse $b$ of waveform J the output of integrator 30 ramps down to the value shown and then holds this value until pulse $c$. This operation continues until the end of pulse $e$ of waveform J. At this time, the output voltage of integrator (summer) 30, which is indicated at $g$, on waveform K represents the algebraic sum of the five preceding input pulses. This voltage is sampled at a time indicated in the timing diagram of FIG. 4(F) and the voltage waveform L of FIG. 4(L) is presented to output terminal 32.

The equalizer discussed to this point is primarily adapted for use with amplitude modulated data sets in which the received line signal is demodulated and filtered before application to the equalizer. The output of this equalizer is a series of voltage levels or steps from which data can be derived and the output occurs at the baud rate of the signal so that there is one signal sample per baud. There are instances, however, in which the signal between baud samples is employed for clock recovery and reference is made to U.S. Pat. No. 3,746,800, for a discussion of such a system. In such systems, two data samples per baud are required and under these circumstances the number of data sample capacitors and switch positions is twice that required for the one sample per baud considered above. The sequence of data sample selection is also changed.

Figure 5:
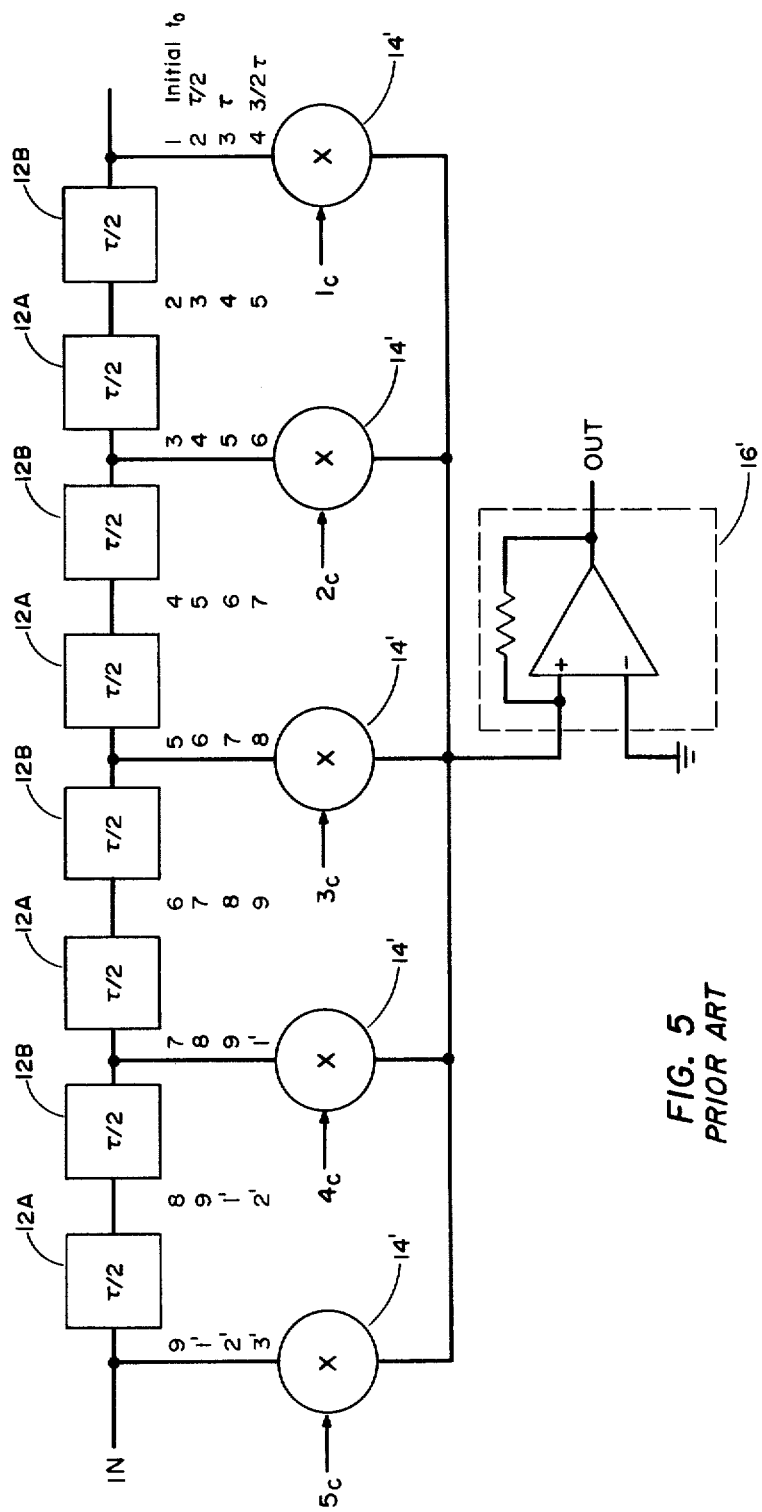
FIG. 5 is a schematic circuit diagram, similar to that of FIG. 1, of a two sample per baud equalizer.

Referring to FIG. 5, a prior art two sample per baud equalizer is represented in a manner similar to that of FIG. 1 with each of the delay sections 12 being broken down into two sections 12A and 12B. The further corresponding elements in FIG. 5 are given the same numbers with primes attached. The equalizer of FIG. 5 would be implemented in the same manner as illustrated in FIG. 2 except that ten data sample capacitors 22 are required and switch S-2 would be a 10-position switch. The changed or new data selection is shown in FIG. 6(A) to 6(D) which respectively show the coefficient capacitor switching sequence, the data sample capacitor switching sequence, the time ($\tau/10$), and the frame, and the reason for the sequence change is apparent from the sample numbering shown in FIG. 5.

The automatic equalizer technique of the invention can also be employed to equalize before signal demodulation in quadrature AM (See U.S. Pat. No. 3,400,322) and phase modulated (See U.S. Pat. No. 3,727,136) data sets. In such cases, several factors must be considered regarding the data sampling rate. First, the sampling rate must be a multiple of the baud rate to ensure proper delay. Second, the sampling rate must be at least two times the highest line frequency to prevent "aliasing". Third, the equalizer output will usually be filtered to return the signal to a full analog signal. To meet the preceding three requirements and to assure that the output filter is relatively simple, it is generally found that the signal must be sampled at four times the baud rate. For a five tap equalizer with four samples per baud, switch S-2 of FIG. 2 becomes a twenty position switch and the number of data sample capacitors is increased from five to twenty. The data selection sequence is illustrated in FIGS. 7(A) to 7(D) which respectively show the coefficient capacitor switching sequence, the data sample capacitor switching sequence, the time ($\tau/20$) and the frame.

The circuit of FIG. 2 is made practical by the use of low cost metal oxide semiconductor (MOS) analog multiplexer integrated circuits. FIG. 8 shows a block diagram of a standard eight-channel MOS integrated circuit multiplexer. The multiplexer includes a one-of-eight selector circuit 40 having logic control input lines 41 marked $2^0$, $2^1$, $2^2$ and an output enable input 42. The eight outputs are connected to internal MOS transistors 44 which are each connected to a common connection 46 as well as to a corresponding one of eight outputs. A selection table for the circuit of FIG. 8 illustrating how the logical control input lines $2^0$, $2^1$, $2^2$ select each of the eight positions of the switch is shown below.

| Logic Level | | | | Common Connected |
| $2^0$ | $2^1$ | $2^2$ | Output Enable | to Selector No. |
|---|---|---|---|---|
| 0 | 0 | 0 | 1 | 1 |
| 1 | 0 | 0 | 1 | 2 |
| 0 | 1 | 0 | 1 | 3 |
| 1 | 1 | 0 | 1 | 4 |
| 0 | 0 | 1 | 1 | 5 |
| 1 | 0 | 1 | 1 | 6 |
| 0 | 1 | 1 | 1 | 7 |
| 1 | 1 | 1 | 1 | 8 |
| X | X | X | 0 | All switches open |

Figure 9:
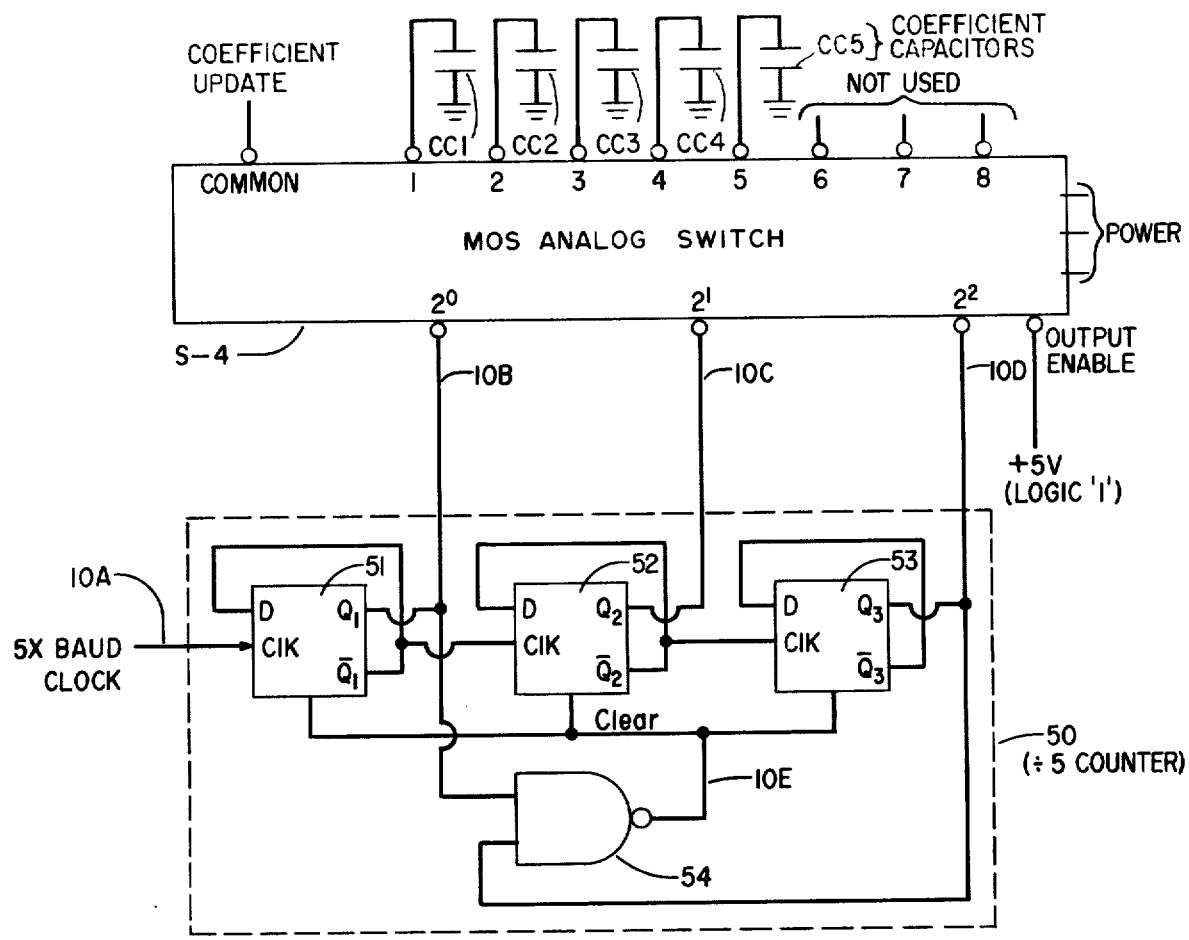
FIG. 9 is a schematic circuit diagram of a multiplexer such as shown in FIG. 8 incorporated in a practical embodiment of the coefficient circuit of the invention.
Figure 10:
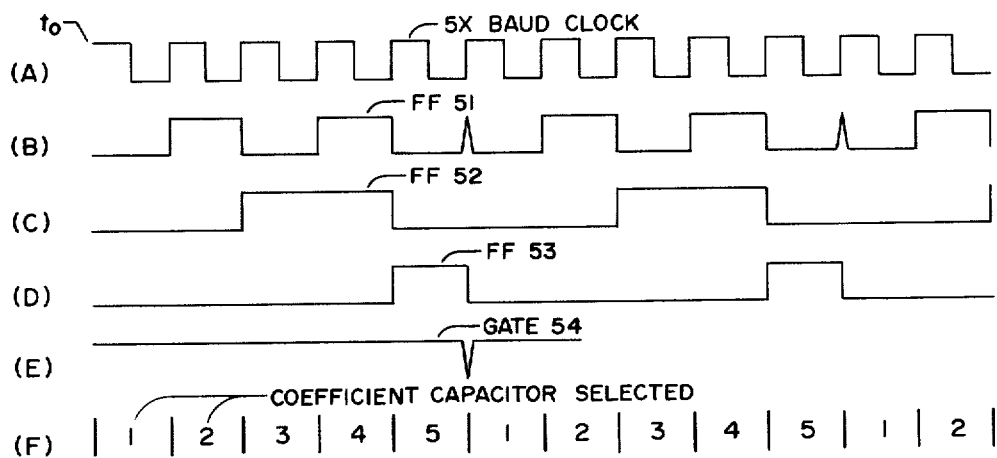
FIGS. 10(A) to 10(F) are voltage waveforms and other timing diagrams associated with the circuit of FIG. 9.

Referring to FIG. 9, a specific practical embodiment of the coefficient circuit of FIG. 2 is illustrated. The circuit includes a MOS analog switch corresponding to switch S-4 of FIG. 2 with coefficient capacitors CC1, CC2, CC3, CC4 and CC5 connected to five of the outputs. A divide by five digital counter circuit produces the logic control selector inputs to switch S-4 and is formed by three "D" flip-flops 51 to 53 and a dual input Nand gate 54. The digital counter 50 drives the analog switch S-4 so as to connect the capacitors CC1 to CC5 in proper sequence. The relevant waveforms as shown in FIGS. 10(A) to 10(E) which respectively illustrate the baud clock waveform and the waveforms of flip-flops 51 to 53 and gate 54. FIG. 10(F) shows the coefficient capacitor selected.

It will be noted that FIGS. 10(A) to 10(F) that the digital output of the counter 50 is one less than the assigned number of the capacitors CC1 to CC5. For example, when capacitor CC4 is selected, the reading of counter 50 is:

$$\left.\begin{array}{l} 2^0 = \text{flip-flop } 51 = 1 \\ 2^1 = \text{flip-flop } 52 = 1 \\ 2^2 = \text{flip-flop } 53 = 0 \end{array}\right\} = (1 \times 2^0) + (1 \times 2^1) + (0 \times 2^2) = 3$$

Modification of the coefficient circuits for different purposes is straightforward. If, for example, a twenty-five tap equalizer is required, the divide by five counter 50 of FIG. 9 is replaced by a divide by twenty-five counter and twenty-five capacitors are connected to four MOS eight-position multiplexers such as shown in FIG. 8. More generally, a divide by N counter which counts from 0 to N-1 is used for one data sample per baud operation, where N is the number of taps of the equalizer. For two sample per baud operation, the counter counts from 0 to 2N-1 and for four sample per baud operation the counter counts from 0 to 4N-1.

Figure 11:
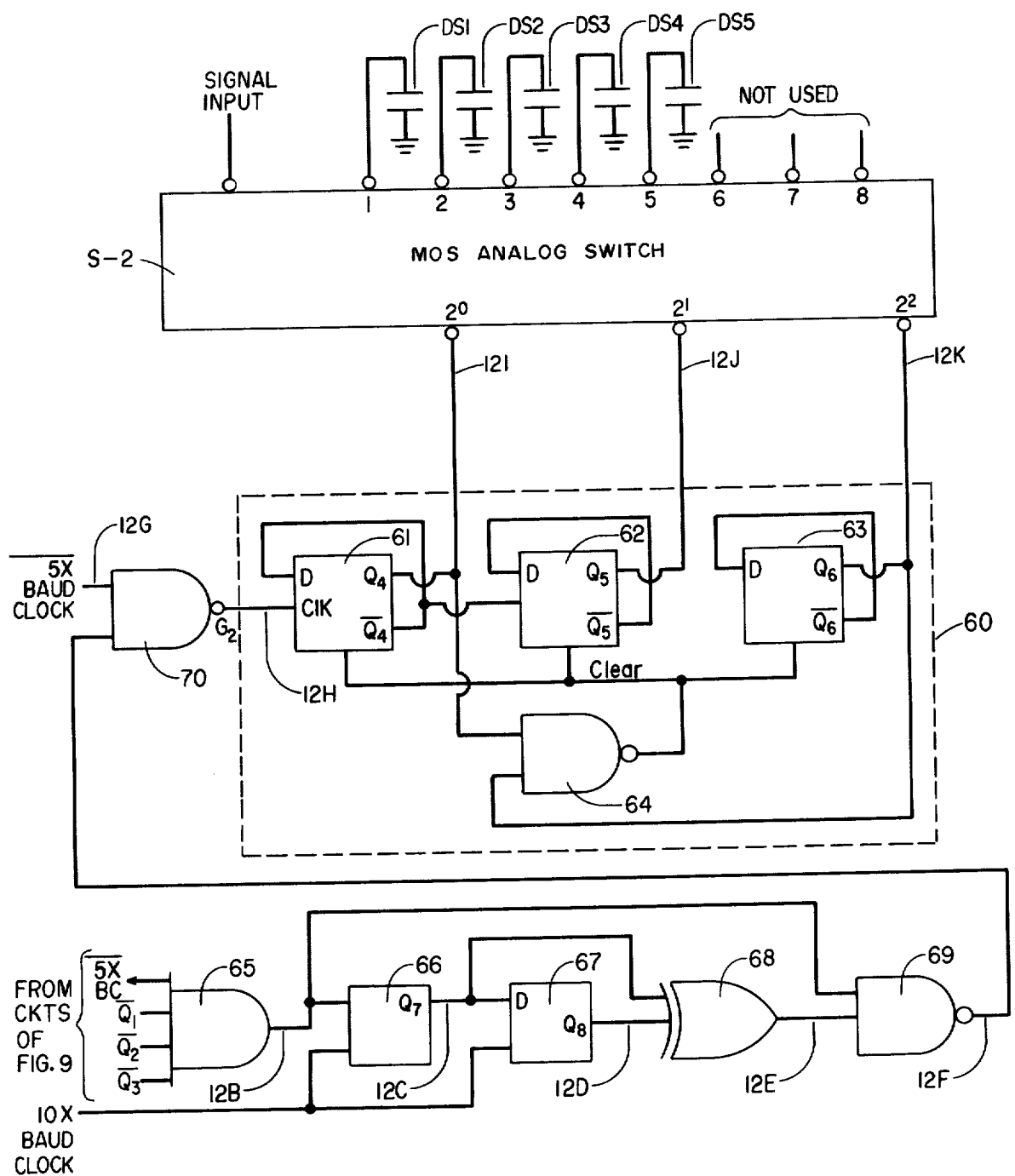
FIG. 11 is a schematic circuit diagram, similar to that of FIG. 9, of a practical embodiment of the data sample circuit of the invention.

Referring to FIG. 11, a practical embodiment of the data sample circuit of FIG. 2 is shown. The circuit includes an MOS analog switch corresponding to switch S-2 of FIG. 2 and of the same form as switch S-4 of FIG. 9. Data sample capacitors DS1 to DS5 are connected to five of the outputs of switch S-2 while a divide by five counter 60 corresponding to that of FIG. 9 and comprising flip-flops 61 to 63 and gate 64 is connected to the logic inputs.

Before describing the remainder of the circuitry, it will be seen in comparing the coefficient sequence of FIG. 4(A) and FIG. 4(C) that while the coefficient sequence is a cyclic 1 to 5 count as stated hereinabove, the data samples count 1 through 5 but make one additional "jump" when coefficient capacitor CC1 is selected, this jump is being made during the center of the number 1 coefficient interval. The jump in question is effected by modifying the clock input to flip-flop 61. This is accomplished by the circuitry shown in FIG. 11 including a four input And gate 65 which receives the 5X $\overline{BC}$, $\overline{Q_1}$, $\overline{Q_2}$ and $\overline{Q_3}$ outputs of the coefficient circuit of FIG. 9. The output of gate 65 forms one input of a flip-flop 66 which also receives a 10X baud clock signal. This baud clock signal is also connected to a second flip-flop 67 which also receives the $Q_7$ output of flip-flop 66. A dual input exclusive-OR gate 68 receives the $Q_7$ output of flip-flop 66 and the $Q_8$ output of flip-flop 67. A dual input Nand gate 69 receives the output of gates 68 and 65 and is connected to one input of a further dual input N and gate 70. The second input of gate 70 is formed by the 5x baud clock and the output thereof is connected to flip-flop 61 of counter 60.

Figure 12:
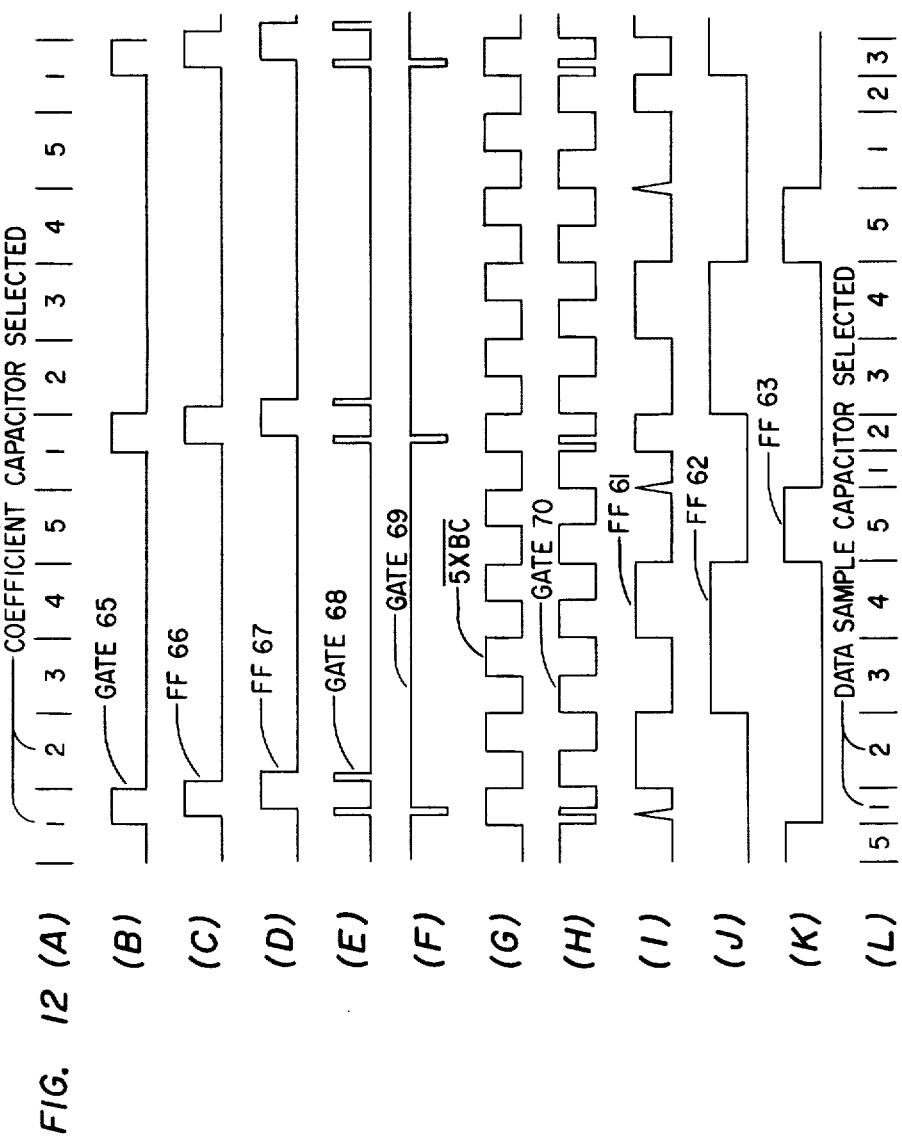
FIGS. 12(A) to 12(L) are voltage waveforms and other timing diagrams associated with the circuit of FIG. 11.

The waveforms associated with the embodiment of FIG. 11 are shown in FIGS. 12(A) to 12(L). FIG. 12(A) shows the coefficient capacitor switching sequence of FIG. 9 while FIGS. 12(B) to 12(K) show, respectively, the waveforms for gate 65, flip-flops 66 and 67, gates 68 and 69, 5 × $\overline{BC}$, gate 70, flip-flop 61, flip-flop 62, and flip-flop 63. Waveform 12(L) shows the resultant switching sequence for the data sampling capacitors DS1 to DS5.

It is noted that the control voltages referred to above can be derived in a number of conventional ways. It will be understood that in the basic prior art automatic equalizer of FIG. 1, multiplier control voltages 1c to 5c are required whereas in the embodiment of the invention shown in FIG. 2 similar voltages are required but in a sequential, i.e., time multiplexed, form, this voltage sequence being applied to the coefficient update terminal 26. The circuitry for providing the coefficient update voltages is represented by the block denoted CUC in FIG. 2 and, as noted hereinabove, is connected between the output of the equalizer and update terminal 26. Many of the patents referred to above in the discussion of the prior art disclose schemes for deriving the coefficient voltages which can be utilized. For example, U.S. Pat. No. 3,727,136 discloses a method of generating coefficient voltages in a line frequency band equalizer for a phase modulated data set and U.S. Pat. No. 3,289,108 discloses a method of generating coefficient voltages for motor controlled attenuators. The short duration pulses from the control lines used in these patents to update the stored coefficients can, for example, be coded so that a logical "one" decreases attenuation and a logical "zero" increases attenuation.

Although the invention has been described relative to an exemplary embodiment thereof, it will be understood by those skilled in the art that variations and modifications may be effected in this embodiment without departing from the scope and spirit of the invention.

I claim:

1. An automatic tranversal equalizer including means for sampling an input signal, a plurality of capacitors for storing the sampled input signal in sequence, a further plurality of capacitors for storing tap coefficient voltages derived from the output of the equalizer, means for sequentially updating said further plurality of capacitors, and a single multiplier having a first input connected to receive said data samples stored by the first mentioned plurality of capacitors in a predetermined sequence, and a second input for receiving the coefficient tap voltages stored by said further plurality of capacitors in a predetermined sequence and for providing an output in accordance with the product of said data samples and said coefficient tap voltages.

2. A equalizer as claimed in claim 1 further comprising an integrator means for summing the outputs of said multiplier means and means for resetting said integrator to zero at a rate which is a multiple of the data baud rate.

3. An equalizer as claimed in claim 2 further comprising a sample and hold circuit for sampling and holding the output of said integrator means to produce an equalizer output signal.

4. An equalizer as claimed in claim 3 further comprising means for selecting said further plurality of capacitors in sequence comprising divide by N counter means which counts from 0 to N-1, where N is the number of taps of the equalizer.

5. An equalizer as claimed in claim 4 which provides one data sample per baud operation, said equalizer further comprising means for selecting the first mentioned plurality of capacitors in sequence comprising counter means for counting from 0 to N-1.

6. An equalizer as claimed in claim 4 which provides two sample per baud operation, said equalizer further comprising means for selecting the first mentioned capacitors in sequence comprising counter means for counting from 0 to 2N-1.

7. An equalizer as claimed in claim 4 which provides four data samples per baud, said equalizer further comprising means for selecting the first mentioned capacitors in sequence comprising counter means for counting from 0 to 4N-1.

8. An automatic transversal equalizer comprising means for sampling the input signal to the equalizer, a first plurality of capacitors for storing the sampled voltages in a predetermined sequence, a further plurality of capacitors for storing internally generated coefficient voltages derived from the output of the equalizer, a single multiplier having first and second inputs for producing an output in accordance with the product of the voltage inputs thereto, switching means for applying said sampled voltages and said coefficient voltages to respective ones of said first and second inputs of said multiplier in predetermined sequence, and integrator means for integrating the output of said multiplier.

9. An automatic transversal equalizer as claimed in claim 8 further comprising a sample and hold circuit for sampling and holding the output of said integrator means.

10. An automatic transversal equalizer as claimed in claim 9 wherein said switching means comprises MOS analog switch means.

11. An automatic transversal equalizer as claimed in claim 10 wherein said MOS analog switch means comprises means comprising first counter means, responsive to the baud clock of the equalizer and a first MOS analog switch, for controlling the switching sequence of said coefficient voltages and means, comprising logic circuit means responsive to said first counter means, second counter means responsive to said logic circuit means and said baud clock and a second MOS analog switch, for controlling the switching sequence of said sampled voltages.

12. An automatic transversal equalizer comprising means for sampling an input signal, a plurality of discrete capacitors connected in parallel to form a bank of capacitors for storing the samples of said input signal, switching means for cyclically and sequentially retrieving the samples stored by said capacitors in a predetermined sequence, the samples stored by said capacitors being retrieved during at least two successive cycles, means for deriving a series of coefficient voltages from the output of the equalizer, and multiplier means for sequentially multiplying the samples retrieved by said switching means with said series of coefficient voltages to produce an output in accordance with the product of said retrieved samples and said coefficient voltages.

* * * * *